United States Patent [19]

Mashimo

[11] Patent Number: 5,841,597
[45] Date of Patent: Nov. 24, 1998

[54] DIVIDED MASTER TAPE PRODUCTION DEVICE, DUBBING DEVICE AND DUBBING SYSTEM WHICH IS EQUIPPED WITH THESE DEVICES

[75] Inventor: Michinori Mashimo, Mito, Japan

[73] Assignee: Victor Company of Japan, Ltd., Yokohama, Japan

[21] Appl. No.: 644,659

[22] Filed: Apr. 24, 1996

[30] Foreign Application Priority Data

Apr. 27, 1995 [JP] Japan ..................................... 7-127043

[51] Int. Cl.⁶ ....................................................... G11B 5/86
[52] U.S. Cl. ................................ 360/15; 360/23; 360/26; 386/53
[58] Field of Search .................................. 360/15, 22, 23, 360/24, 26, 27, 13; 364/84, 85; 386/4, 54, 53

[56] References Cited

U.S. PATENT DOCUMENTS

| | | | |
|---|---|---|---|
| 4,357,702 | 11/1982 | Chase et al. | 360/26 X |
| 5,481,411 | 1/1996 | Nakatani | 360/15 X |
| 5,530,599 | 6/1996 | Sakigawa | 360/26 |
| 5,636,311 | 6/1997 | Nakatani | 360/15 X |

FOREIGN PATENT DOCUMENTS

| | | |
|---|---|---|
| 247304 | 9/1992 | Japan . |
| 7-98870 | 4/1995 | Japan . |
| 2254182 | 9/1992 | United Kingdom | 360/15 |

*Primary Examiner*—Aristotelis M. Psitos
*Assistant Examiner*—Larry T. Cullen
*Attorney, Agent, or Firm*—Michael N. Meller

[57] ABSTRACT

A high-speed dubbing system which is not a complicated system adjusts phase shifts to return a plurality of multiple divided master tape audio signals to a time series signal array which is the same as that of the original master tape signal. The dubbing system has a continuous digital audio signal obtained by playing back the master tape at a nominal playback speed; the audio signal is divided by a specified division unit and an array of data blocks is obtained and converted to generate N units of divided master tape playback signals, a specified length portion of each data blocks of the N systems of divided master tape playback signals is replaced by phase matching code data. The N systems of divided master tape playback signals are intermittently recorded onto tape at the nominal playback speed to produce N divided master tapes. These N divided master tapes are played back simultaneously and in synchronism to obtain N systems of playback signals. In each of the N systems of playback signals, a valid data block portion is obtained based on the phase matching code data, by matching the phases of the N systems of playback signals so that the matched data blocks become the same as the playback signals of the original master tape. The N systems of playback signals are compressed to 1/N to generate an NX-speed recording signal, and this NX-speed recording signal is recorded onto a slave recording medium at N times the nominal playback speed.

7 Claims, 13 Drawing Sheets

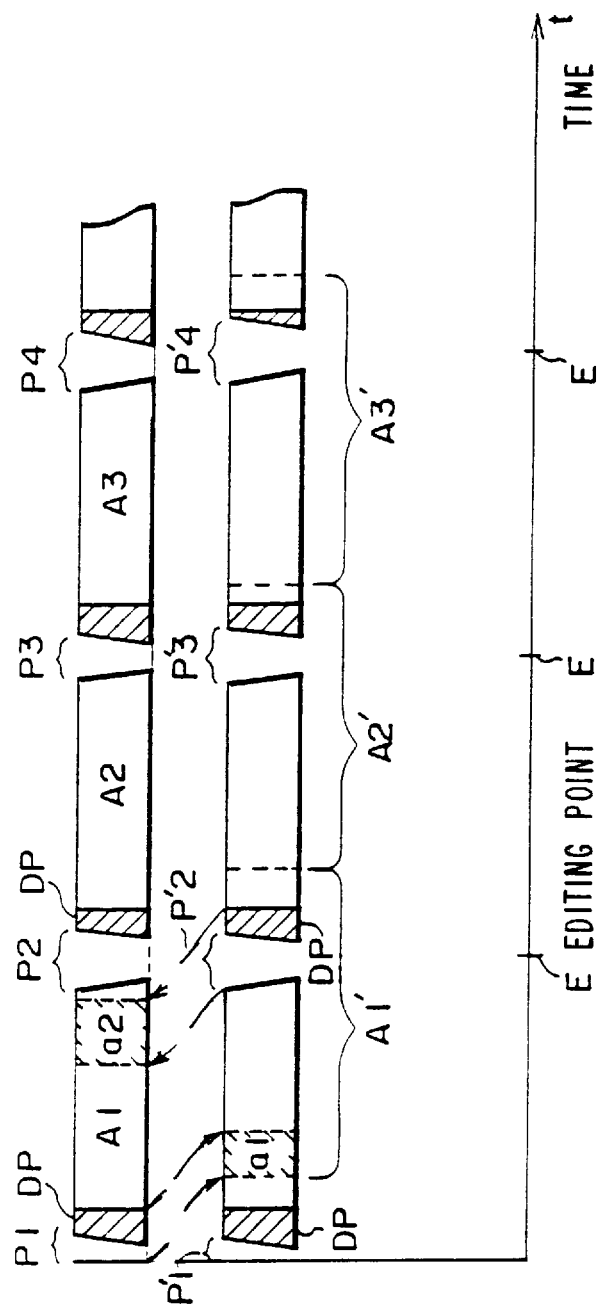

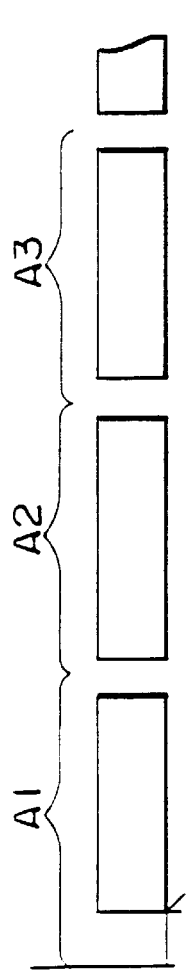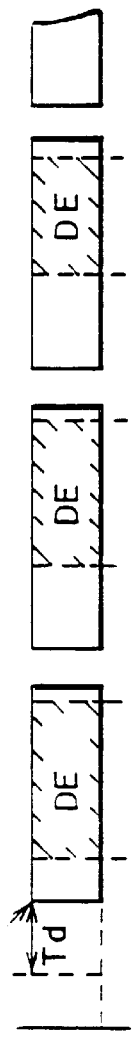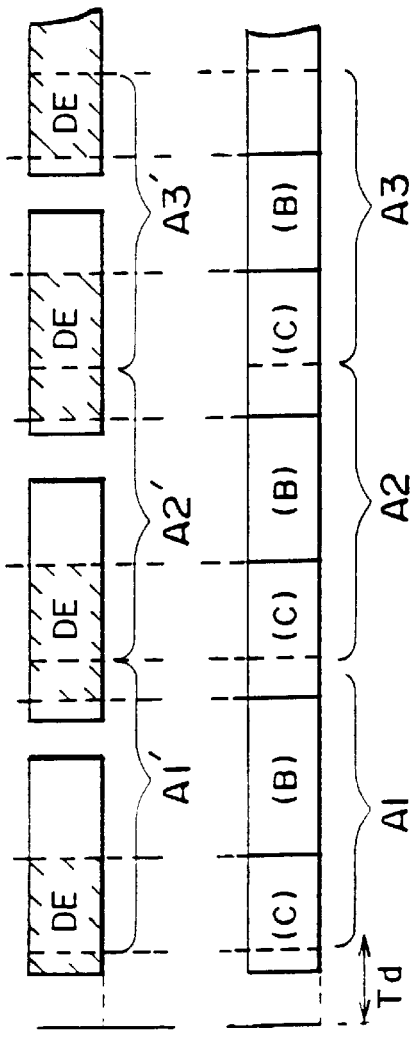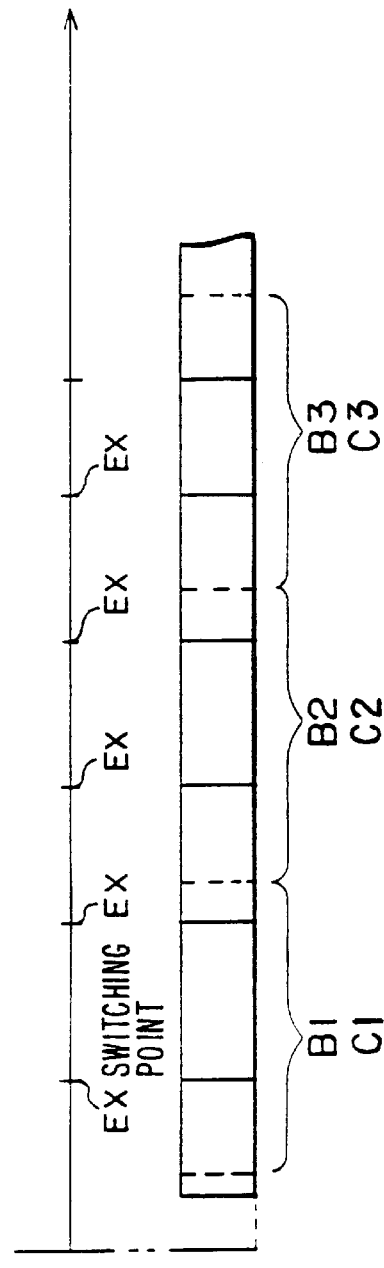
FIG.11A
FIG.11B
FIG.11C
FIG.11D
FIG.11E

DIVIDED MASTER TAPE PRODUCTION DEVICE, DUBBING DEVICE AND DUBBING SYSTEM WHICH IS EQUIPPED WITH THESE DEVICES

BACKGROUND OF THE INVENTION

1. Field of the Invention

The present invention relates to a dubbing device which produces multiple recorded magnetic tapes, such as video soft tapes or audio soft tapes, from an original master, and it relates particularly to a device which dubs video soft tape at high speed and to a system with these capabilities.

2. Description of the Prior Art

The applicant has proposed a device which plays back a master tape on a master tape playback device and dubs at high speed by means of multiple slave recording devices (Japanese Laid-Open Patent Publication No. HEI 4-247304).

In the stage before dubbing, this dubbing device uses a divided master tape production device, which produces N divided master tapes by sequentially assigning and recording a continuous signal obtained by playing back the master tape to N (where N is an integer of 2 or more) units of prepared recording devices for each specified division unit and repeating this through the entire master tape. Moreover, in this prior art device, during dubbing, recording signals speeded up by N times are generated by compression to 1/N while arraying N systems of playback signals obtained by playing back the aforementioned N divided master tapes simultaneously and in synchronization by means of N playback devices so that they become the same as the original master tape playback signal, and this is recorded by a slave recording device at N times ("times" hereinafter referred to as "X-") the nominal playback speed.

The basic principles of creating the aforementioned divided master tapes will be explained using FIG. 1. For convenience, here, N shall be considered to equal 3.

FIG. 1(A) indicates continuous playback signal data which was output by playing back the original master tape at the nominal playback speed, where d is the specified division unit, and the data blocks are indicated by D1, D2, D3, . . . , etc.

FIGS. 1(B), 1(C) and 1(D) show the signal data block arrays recorded on the three divided master tapes, A, B and C.

As the aforementioned original master tape playback data reaches the specified division unit amount, it is sequentially assigned, alternately, to the three divided master tape recording devices, and it is recorded at the nominal playback speed.

For this reason, the three recording devices are individually controlled so that recording and standby are repeated, resulting in recording formats such as those shown in FIGS. 1(B), 1(C) and 1(D). That is, every third original master tape data block is recorded to the respective divided master tapes, A, B and C.

Next, as shown in FIG. 2, during dubbing, the three groups of signals shown in FIGS. 2(A), 2(B) and 2(C) are obtained by playing back the aforementioned three divided master tapes, A, B and C, simultaneously, in synchronization and at the same speed at which they were recorded.

Then, returning these three groups of data signals to the original signal format array, such as that shown in FIG. 1(A), and while compressing them into ⅓ the time, a 3X-speed recording signal such as that shown in FIG. 2(D) is generated. Then, by recording this with a slave recording device set to three times the normal speed (relating to tape running and head drum rotation), 3X-speed dubbing is achieved. Through the same type of concept, by setting the number of divisions N at 2, 4. . . and setting the compression ratio N at 1/2, 1/4, . . . to correspond to this, 2X-, 4X-, . . . NX-speed dubbing is performed.

Advantages of this dubbing method are that master tape playback and divided master tape recording and playback can be performed at the nominal playback speed, and because only the slave recording devices record at NX-speed, a master-side conventional master-side recording/playback device can be used as is. Therefore, it is possible to largely control high-speed dubbing system development costs or equipment remodeling costs. There is also an advantage in that conventional magnetic tape can be used without being concerned about abuse from high-speed running of the master-side tape.

However, in the aforementioned device, the video signal and the audio, signal are processed independently, where, with respect to the audio signal, when recording onto the divided master tape, recording is performed by dividing for each specified division unit in the same way as the video signal, but when this is done, two systems of audio signals, non-delayed audio signals and delayed audio signals, are prepared, and they are respectively recorded onto divided master tape.

Then, during dubbing, multiple divided master tapes are played simultaneously and in synchronization, and delay processing is performed on the audio signals recorded without a delay among the 2N (N times 2) systems of audio signals obtained, and both are considered in-phase signals.

Then, the method employed is one by which the array is made the same as that of the original master tape playback signal after adopting a configuration by which, while selectively switching the aforementioned delay processed audio signal and the audio playback signal delayed and recorded in advance, the valid data portion is obtained, resulting in a signal which is the same as the specified division unit audio signal during the production of the aforementioned divided master tapes.

This is because, in recording devices used during production of the divided master tapes, there is a component at the editing point during recording in which a function which forcibly performs fade in or fade out processing of the audio signal operates, and when this type of recording device is used in recording each time the specified division unit audio signal is assigned, through the aforementioned function, recording is performed with part of the audio signal having dropped out, and in this condition, it is not possible to return to the original continuous signal during dubbing.

However, in the aforementioned way, a delay processing means is added with respect to digital audio signals, but it is understood that the start ends and the finish ends of the respective audio signal data blocks actually recorded on the multiple divided master tapes may be in a condition in which they are shifted in time hereunder referred to as "phase shift") due to the existence of overwriting with a few unspecified, meaningless data immediately before fade in and immediately after fade out during editing in the aforementioned N divided master tape recording devices and due to slight editing start point disparities among the multiple recording devices.

The amount of this phase shift is unspecified and is difficult to estimate. This is a problem peculiar to audio signals.

When a synchronization signal is added as in the case of a video signal, it is possible to adjust slight phase shifts, but when they are not slight, it is difficult to adjust the phase shift.

For this reason, when an attempt is made to fetch data at the same timing according to the original time axis without considering the aforementioned respective playback signal phase shifts, before and after the data block, dropping out of data or treatment of a condition where part of the data of the adjacent block has been added as one data block occurs, and even if this type of data block was arrayed and corrected as a time series, there were cases where the order of the data was not the same as that of the original signal. For this reason, sound was interrupted and noise occurred due to incorrect data order in those systems which performed high-speed dubbing on the slave-side recording devices.

In order to perform control so that this type of dropping out of audio data is eliminated, large-scale remodeling of the divided master tape recording/playback device is required, and accurate synchronization control means are needed for the multiple recording/playback devices. Also, even if, for example, this remodeling is possible, the system itself becomes extremely complicated, resulting in an increase in the danger of trouble occurring

BRIEF SUMMARY OF THE INVENTION

1. Object of the Invention

The object of this invention is to provide a divided master tape production device and a dubbing device, which are able to adjust the phase shift without making the system complicated in order to return the multiple divided master tape audio signals to the same time series array as the original master tape signal, as well as a dubbing system which is equipped with these devices.

2. Brief Summary

Provided, according to the first aspect of this invention, is a divided master tape production device which plays back a master tape and produces N (where N is an integer of 2 or more) divided master tapes comprising:

a master tape playback means for playing back a master tape at a nominal playback speed to obtain a continuous digital audio signal;

a dividing means for dividing the continuous digital audio signal obtained from the master tape playback means by a specified division unit to provide a plurality of data blocks in the digital audio signal and for converting the plurality of data blocks in the continuous digital signal to generate N systems of divided master tape playback signals;

a phase data replacement means for replacing, with respect to the N systems of divided master tape playback signals generated by the dividing means, a certain fixed length section of each data block with phase matching code data; and N units of divided master tape recording means, corresponding in number to the N systems of divided master tape playback signals, in which part of each signal data blocks has been replaced by phase matching code data by said phase data replacement means, wherein said N units of divided master tape recording means includes means for assigning and feeding the divided master tape playback signals and in order, for intermittently recording onto tape at the nominal playback speed and for producing N divided master tapes.

Also, provided, according to the second aspect of this invention, is a dubbing device which integrates a recorded data of N (where N is an integer of 2 or more) divided master tapes produced by playing back the master tape comprising:

N units of divided master tape playback means for, simultaneously and in synchronism, playing back N units of divided master tape produced by an intermittent recording, at a nominal playback speed, of N systems of master tape playback signals generated by continuously dividing digital audio signals into data blocks obtained by playing back the master tape at the nominal playback speed by a specified division unit and means for coverting the data blocks, means for replacing a certain specified length portion of each data blocks with phase matching code data, to obtain N systems of divided master tape playback signals;

a phase matching means for, with respect to the respective N systems of playback signals obtained from the N units of divided master tape playback means, obtaining a valid data portion based on the phase matching code data and for matching the phases of the N systems of playback signals;

an NX-speed recording signal generating means for compressing N systems of playback signals to a 1/N signal to generate an NX-speed recording signal, the NX-speed recording signal generating means including arraying the N systems of playback signals whose phases have been matched by the phase matching means so that the playback signals become the same as the original master tape playback signals; and a slave recording means for recording the NX-speed recording signal generated from the NX-speed recording signal generating means onto a slave recording medium at N times the nominal playback speed.

In addition, provided, according to the third aspect of this invention, is a dubbing system which performs dubbing by playing back a master tape, creating N (where N is an integer of 2 or more) divided master tapes, and integrating the recorded data of the N divided master tapes, comprising;

a master tape playback means for playing back a master tape at a nominal playback speed to obtain a continuous digital audio signal;

a dividing means for dividing the continuous digital audio signal into data blocks obtained from the master tape playback means by a specified division unit and for converting the data blocks into signal arrays array to generate N systems of divided master tape playback signals;

a phase data replacement means for, with respect to the N systems of divided master tape playback signals generated by the dividing means, replacing a certain fixed length section of each data blocks with phase matching code data;

N units of divided master tape recording means, where the N units of divided master tape playback signals, in which a part of the data blocks has been replaced by phase matching code data by the phase data replacement means, the tape recording means including means for sequentially assigning and feeding in order, for intermittently recording the data blocks with the phase matching code data therein onto tape at the nominal playback speed and which produce N divided master tapes;

N units of divided master tape playback means for, simultaneously and in synchronism, playing back the N divided master tapes produced by the N units of divided master tape recording means to obtain N systems of playback signals;

a phase matching means for, with respect to the respective N systems of playback signals obtained from the N units of divided master tape playback means, obtaining a valid data portion based on the phase matching code data, said phase matching means including means for matching the phases of the N systems of playback signals;

an NX-speed recording signal generating means for compressing the N systems of playback signals to 1/N to generate an NX-speed recording signal, and for arraying the N systems of playback signals having phases which have been matched by the phase matching means so that the N systems of playback signals become the same as the original master tape playback signal; and a slave recording means for recording the NX-speed recording signal generated from the NX-speed recording signal generating means onto a slave recording medium at N times the nominal playback speed.

The above and other related objects and features of the invention will be apparent from a reading of the following description of the disclosure found in the accompanying drawings and the novelty thereof pointed out in the appended claims.

BRIEF DESCRIPTION OF THE DRAWINGS

FIG. 6 is a diagram which shows the recording signal condition during divided master tape production.

FIG. 11 is a diagram for explaining the process of obtaining the valid data portion from the signal which has been adjusted for phase shift.

DETAILED DESCRIPTION OF THE INVENTION

Appropriate embodiments of the divided master tape production device, the dubbing device, and the dubbing system equipped with these devices relating to the present invention will be explained in detail below based on the attached figures.

Here, the explanation will use the example of the case when N=3, that is, when 3X-speed dubbing is performed. Also, through this, the explanation will first focus on the divided master tape production device and then the high-speed dubbing device, but the dubbing system simply combines the aforementioned two devices, so an explanation of it is omitted.

Divided Master Tape Production Device

Figure 3:
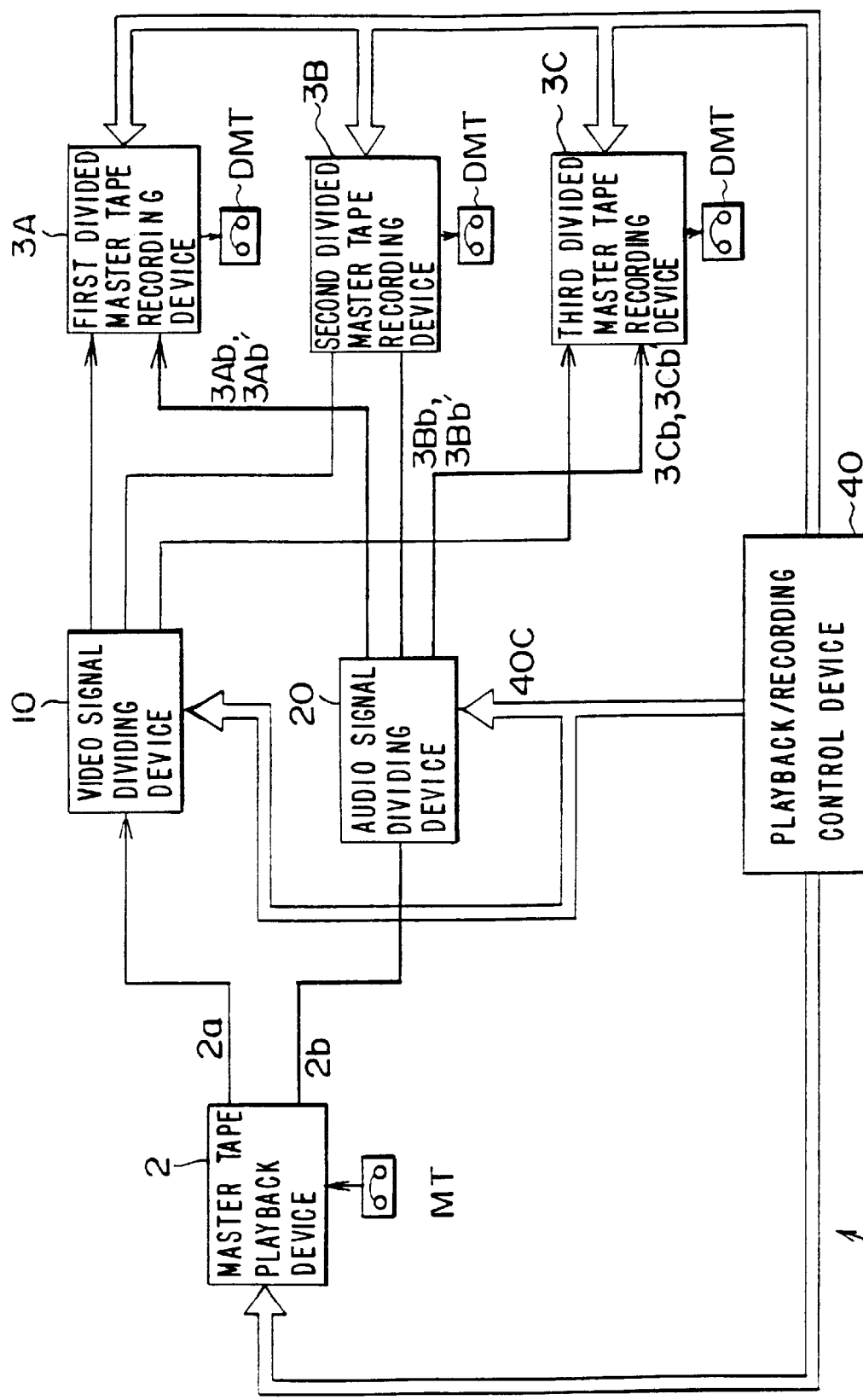
FIG. 3 is a block diagram which shows the divided master tape production device of the present invention.

FIG. 3 is a block diagram which shows the divided master tape production device 1 of the present invention 2 is the master tape playback device, which plays back the original master tape MT, on which the original video signals and audio signals are recorded, at the nominal playback speed, where this master tape playback device 2 outputs the played back digital video signals 2a and digital audio signals 2b. In terms of signal processing, an optimum master tape playback device 2 would be a digital system device (for example, a digital VTR for D2 format and D3 format), but even an analog system will be able to handle the function by performing analog/digital (A/D) conversion on its playback output signals.

3A, 3B and 3C are the first through third divided master tape recording devices, where three units have been prepared in order to produce three divided master tapes to correspond to the 3X speed.

These divided master tape recording devices, 3A, 3B and 3C, intermittently record, at the normal speed, output signals from the video signal dividing device 10 and the audio signal dividing device 20 onto the divided master tapes DMT installed on each of them. As with the aforementioned master tape playback device 2, it is desirable that the divided master tape recording devices, 3A, 3B and 3C, be digital systems, and, here, a D3 format digital VTR is used.

The video signal dividing device 10 and the audio signal dividing device 20 are devices which each divide the continuous video signals and audio signals, which were obtained by the master tape playback device 2 playing back the original master tape MT continuously at the nominal playback speed, separately according to the respective specified rules, convert the arrays, and generate signals for regulated assignment to the multiple divided master tape recording devices, 3A, 3B and 3C.

The playback and recording control device 40 controls the operations of the aforementioned master tape playback device 2, video signal dividing device 10, audio signal dividing device 20, and multiple divided master tape recording devices, 3A, 3B and 3C.

Specifically, the playback and recording control device 40 controls such functions as the operations of playing back and stopping the master tape playback device 2, the intermittent recording operation, which is a repetition of recording and stopping of the divided master tape recording devices, 3A, 3B and 3C, starting and stopping of the operations of the respective signal dividing devices, 10 and 20, and generation of a division timing signal. More specifically, the playback/recording control device 40 performs control so that the data block is output to one of the three divided master tape recording devices, 3A, 3B and 3C, each time the playback signal data continuously output from the playback device 2 reaches the specified division unit amount, and the divided master tape recording device to which it has been assigned records that data block.

Figure 1:
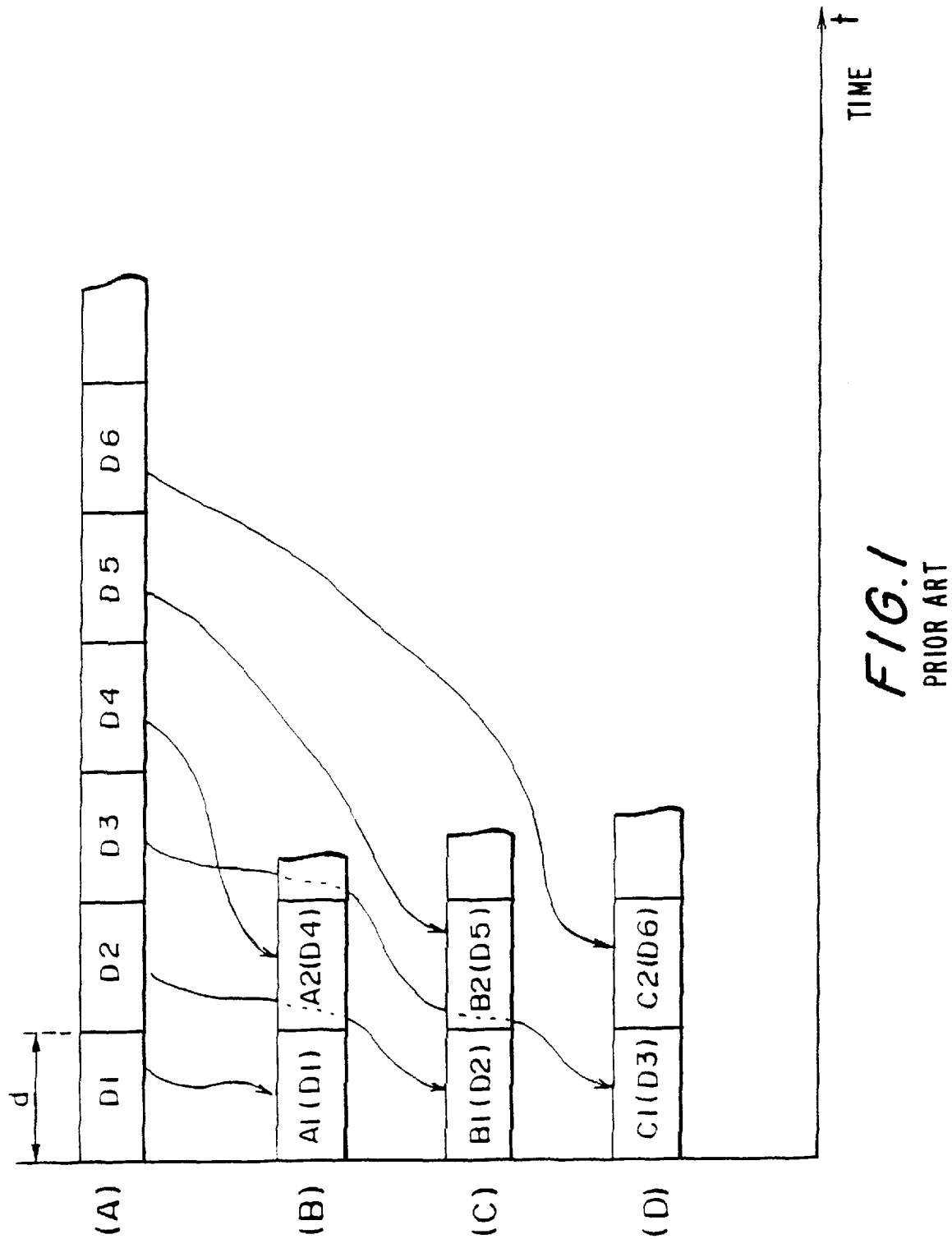
FIG. 1 is a drawing for explaining the basic principles in creating the divided master tapes.
Figure 2:
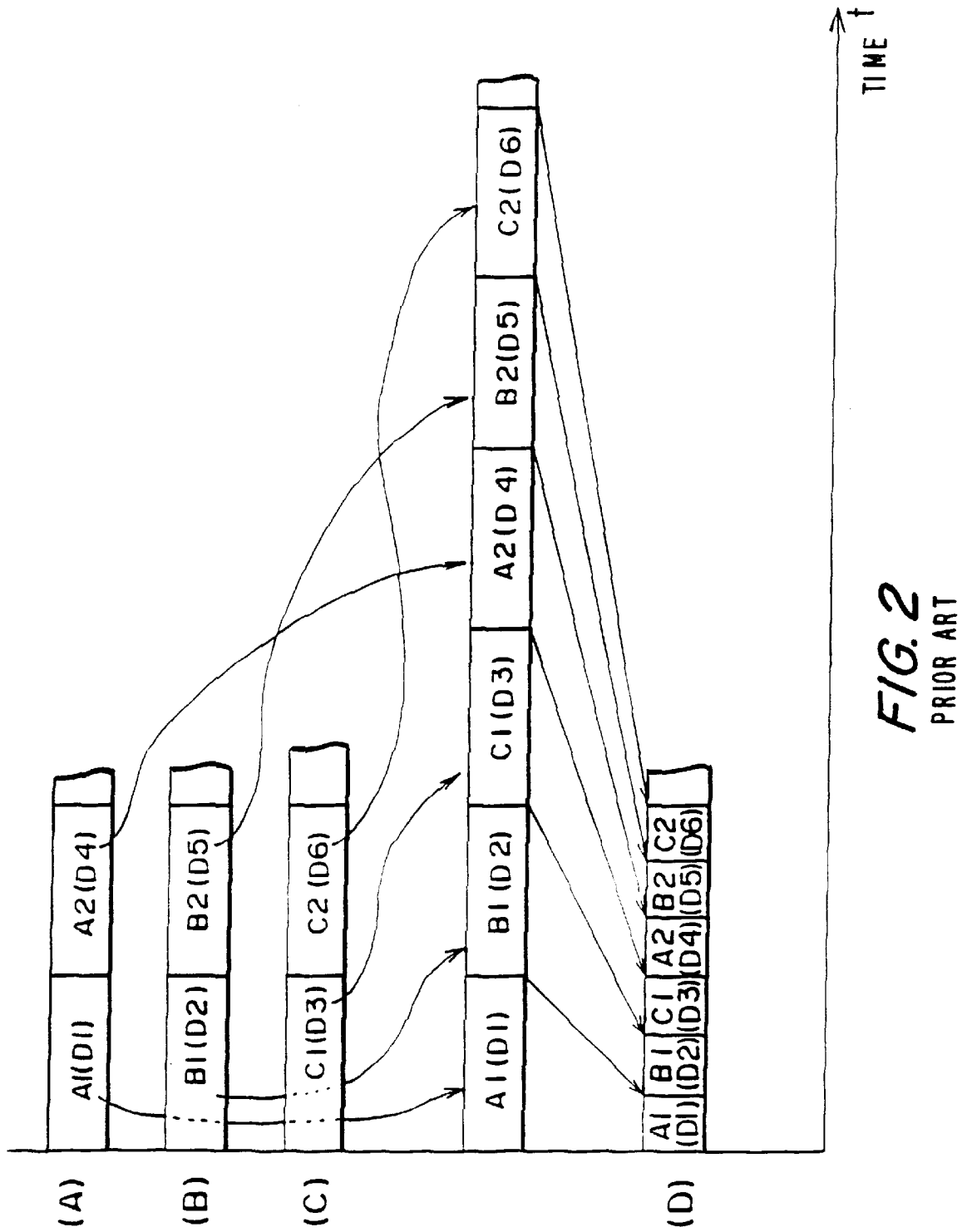
FIG. 2 is a diagram which explains the principles when returning from the divided master tapes shown in FIG. 1 to the original signal format array by means of dubbing.

The data block assignment method involves periodic and sequential assignment as follows: first recording device 3A then second recording device 3B followed by third recording device 3C and thereafter return to first recording device 3A. Then, operations are controlled so that the respective recording devices only record the assigned data block. Therefore, when the data block is assigned in this way, the data blocks of the master tape MT are divided into three as shown in FIG. 1 and are recorded onto the three divided master tapes DMT.

Also, in addition to control in the aforementioned way in which recording is performed for each data block, by performing control of writing to memory of the multiple data block portion signal data which corresponds to several seconds of playback of the original master tape and of retrieving from the memory so that the aforementioned rules are matched, the array of data blocks, which are the multiple specified division units, is converted, and the multiple data blocks whose arrays have been converted and recorded at the same time onto the respective three systems of divided master tape recording devices, 3A, 3B and 3C. By doing this, the recording operation times of the aforementioned divided master tape recording devices, 3A, 3B and 3C, can be extended, and spare time is produced in operational control as well, so the stability and accuracy of the operation improve.

Moreover, control is performed so that the three divided master tape recording devices, 3A, 3B and 3C, perform an intermittent recording operation which repeats constant speed recording, which means respective recording at the nominal playback speed, and stopping, but, by adding control which causes the rewinding then phase modifying playback operation to be performed as the stage before the aforementioned constant speed recording, an accurate recording position can be specified in the time until the next signal to be recorded is assigned, and accuracy of the recorded contents of the divided master tape improves.

Here, as the aforementioned specified division units, in the case of video signals, one color frame, one frame and one field are appropriate, but a grouping of several of these may also be considered one unit. In the case of audio signals, data of a length which corresponds to multiple fields of the video signals may be considered one unit, since there is no appropriate delimiting for the division units as there is in the case of the aforementioned video signals.

Figure 4:
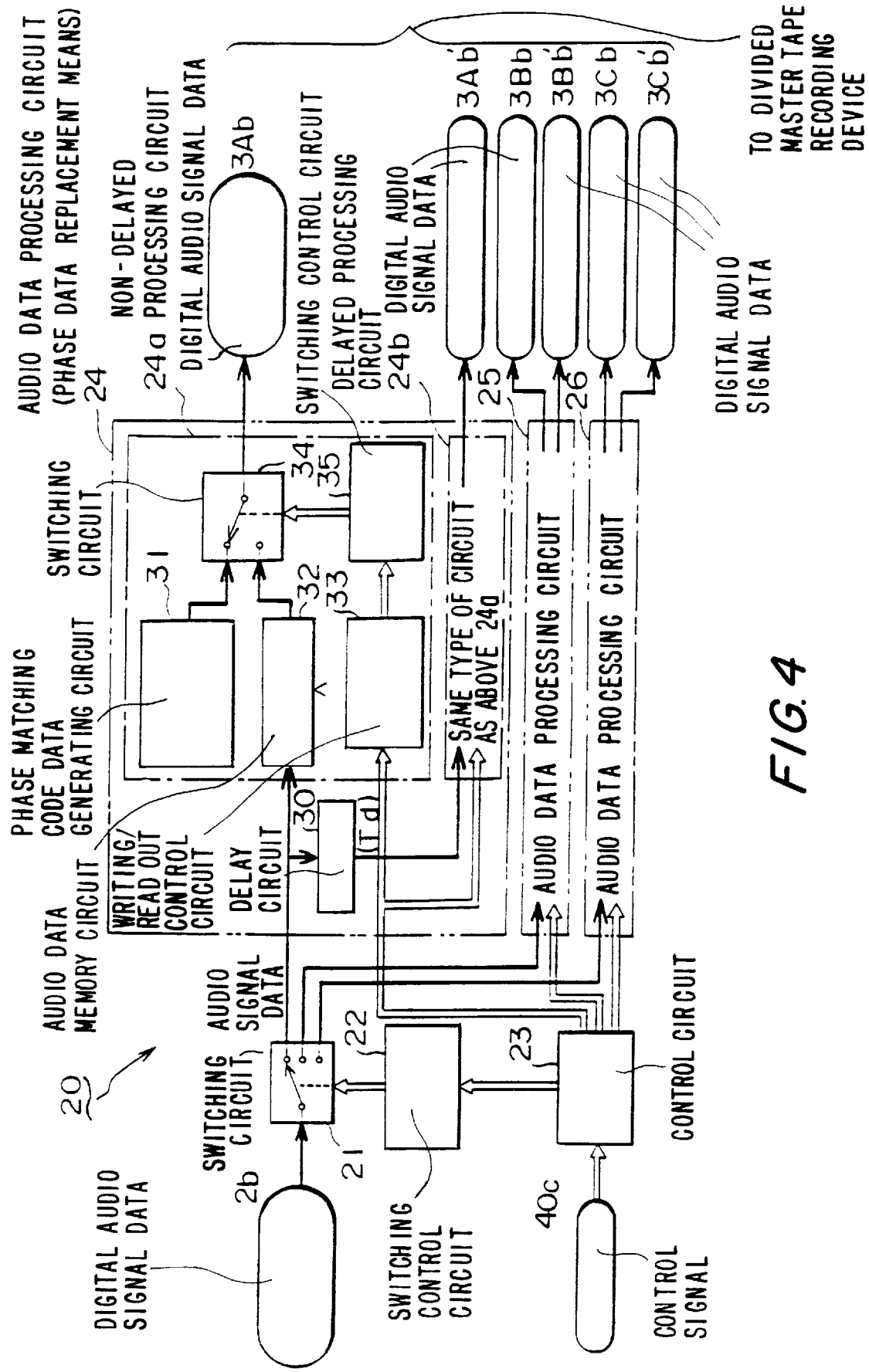
FIG. 4 is a block diagram which shows the internal configuration of the audio signal dividing device in FIG. 3.

FIG. 4 is a block diagram which shows the internal configuration of the audio signal dividing device 20 in FIG. 3.

The switching circuit 21 selectively sends the digital audio signal data 2b output from the master tape playback device 2 to one of the three systems of audio data processing circuits, 24, 25 and 26, as the phase data replacement means which characterize the present invention through control signals from the switching control circuit 22. Through this, audio signal data is periodically apportioned to the next level's audio signal data processing circuits, 24, 25 and 26, for each specified division unit.

The audio data processing circuits, 24, 25 and 26, all have the same configuration, and they consist of a delay circuit 30, a phase matching code data generating circuit 31, an audio data memory circuit 32, a switching circuit 34, a writing/read out control circuit 33, and a switching control circuit 35.

The delay circuit 30 is for providing the specified amount Td of delay with respect to the audio signal data, audio signal data from the switching circuit 21 of the previous stage is divided in two, and only one of those parts passes through the delay circuit 30.

The aforementioned audio signal data which has been divided in two is input to the next non-delayed processing circuit 24a and delayed processing circuit 24b.

Here, the processed audio signal data will only be explained with respect to the non-delayed processing circuit 24a, since the circuit configuration is the same with the only difference being that of its being delayed or non-delayed.

The audio data memory circuit 32 performs writing to memory and retrieving from memory of the specified division unit portion of audio signal data divided by switching circuit 21 according to control signals from the writing/read out control circuit 33.

The writing/read out control circuit 33 performs writing of data to the memory to correspond to the switching timing of the switching circuit 21, and it performs data retrieval from the memory to correspond to the recording timing of the corresponding divided master tape recording device.

The phase matching code data generating device 31 is a circuit which generates specified data used for phase matching, and those data contents will be explained below.

Switching circuit 34 switches signal data from the phase matching code data generating circuit 31 and the audio data memory circuit 32 according to control signals from the switching control circuit 35. Through this, output data from the audio data memory circuit 32 can only be replaced with phase matching code data of the desired position and the desired amount.

Also, the control circuit 23 controls the respective control circuits, 22, 33 and 35, so that they are synchronized with the respective devices according to control signals from the playback/recording control device 40 (see FIG. 3).

Here, the aforementioned delay circuit 30 and switching circuits 21 and 34 can be substituted by the respective memory circuits. That is, substitution is possible with respect to the delay circuit by controlling so that the address during writing and retrieval is shifted so that it corresponds to the amount of the delay, or, substitution is possible with respect to the switching circuits by providing a common audio signal data bus line and controlling this bus line.

In this way, audio signal data 3Ab, for which array conversion is completed and which incorporates specified phase matching code data, is generated from the non-delayed processing circuit 24a, and this signal data is recorded by the divided master tape recording device.

In the same way, data which passes through the delay circuit 30 is also generated from the delayed processing circuit 24b as the audio signal data 3Ab'. Also, the other audio data processing circuits, 25 and 26, are the same, and in FIG. 4, digital signal audio signal data 3Bb and 3Bb' are generated from the mid-level audio data processing circuit 25, and digital audio signal data 3Cb and 3Cb' are generated from the lower-level audio data processing circuit 26. In FIG. 4, the areas surrounded by the single dashed lines and the areas surrounded by the double dashed lines are configured so that they each have the same contents, and descriptions of these have been omitted.

Next, the divided master tape production process performed by the aforementioned device and the phase matching code data replacement process performed during this process will be explained.

Figure 5A:
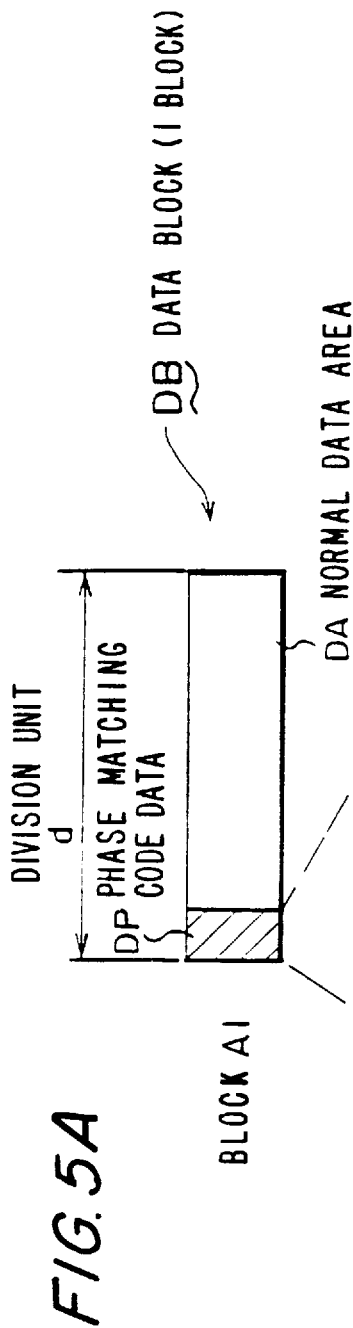
FIG. 5 is a diagram which shows the data blocks of the digital audio signal data shown in FIG. 4.

FIG. 5(A) shows a specified division unit individual data block of the digital audio signal data 3Ab shown in FIG. 4, for example, and a specified data length from the front end of this data block DB is replaced by the phase matching code data DP. This data block DB is such that by initially selecting signal data from the phase matching code data generating circuit 31 for a specified period of time (an amount corresponding to DP) and then switching to the audio data memory circuit 32 side in order to output the original audio signal data, generation is possible. Through this, the normal data area DA which continues from the phase matching code data DP is formed.

Figure 5B:
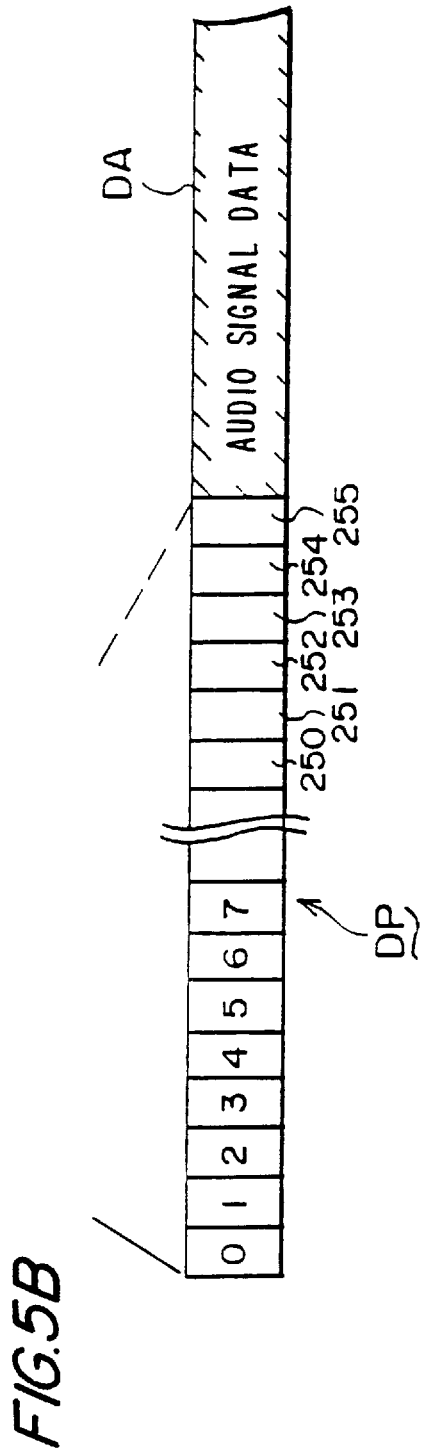

In FIG. 5(B), the contents of the aforementioned phase matching code data DP are shown, and in the present embodiment, the contents of this code data DP are considered to be an aggregate consisting of consecutive integers from 0~255. For the pattern of this phase matching code data DP, a pattern which cannot be adopted by the audio signal data is selected in order to prevent mixing with the audio signal data.

With respect to the other digital audio signal data 3Ab', 3Bb, 3Bb', 3Cb and 3Cb', the same type of processing is performed by the respective processing circuits, and part of the data is replaced by the phase matching code data DP.

In processing circuits 24a and 24b, control is performed so that the switching timing of switching circuit 34 is the same, and in the same way, in the other audio data processing circuits, 25 and 26, as well, control is performed so that the code data replacement timing is the same with respect to those which pass through a delay circuit and those which do not.

FIG. 6 shows the status of the recording signal during divided master tape production, and it is a diagram for explaining how the aforementioned pair of digital audio signal data, 3Ab and 3Ab' (3Bb and 3Bb', 3Cb and 3Cb'), which are non-delayed and delayed, are recorded onto the respective divided master tapes.

Data block A1 in FIG. 6(A) shows audio signal data which is handled one time by the non-delayed processing circuit 24a, for example, in the case in which it does not pass through the delay circuit 30, where the data amount is that of an individual or multiple specified division units. The data block A1' of FIG. 6(B) is audio signal data which is handled one time by the delayed processing circuit 24b, for example, in the case in which it has passed through the delay circuit 30, where delay processing at delay amount Td from data block A1 is performed.

In the aforementioned way, after these two systems of audio signal data of FIG. 6(A) and FIG. 6B) are replaced by code data respectively at the same timing by the respective processing circuits, 24a and 24b, recording onto the divided master tape DMT is, of course, performed at the same timing by divided master tape recording devices 3A, 3B and 3C (see FIG. 3). Actually, an intermittent recording operation, which repeats recording then standby, is repeated, and FIGS. 6(C) and 6(D) show how recording onto the divided master tape DMT is actually performed when this occurs. Here, the editing points in FIG. 6 refer to the recording start (stop) point in the intermittent recording operation of the divided master tape recording device. With respect to the other signal data as well, multiple divided master tapes DMT are produced by recording onto the respective master tapes in the same way.

If the divided master tape recording devices, 3A, 3B and 3C, used here are able to record two systems of audio signals simultaneously, three, which is the number of divisions, divided master tape recording devices may be prepared, and three divided master tapes are also sufficient because, with one unit, in the same way as digital audio signal data 3Ab and 3Ab' or 3Cb and 3Cb', those which pass through the delay circuit 30 and those which do not can be combined and recorded onto one divided master tape DMT simultaneously.

Here, the original master tape audio signal is explained as one system, but the aforementioned one system may be monaural audio 1 ch or stereo audio L, R2 ch. The essential thing is the ability to record the audio signals of two times the number of channels of the audio signals obtained by playing back the original master tape, and here, the divided master tape recording device is a two-system type.

This is because, as shown in FIGS. 6(C) and 6(D), dropping out of data occurs at the respective editing points, but, depending on the delay processing results, the data portion which has dropped out on the FIG. 6(C) side remains on the FIG. 6D) side, and conversely, the data portion which has dropped out on the FIG. 6(D) side remains on the FIG. 6(C) side. In the same way, the data portion which has been overwritten by the phase matching code data remains in the other recorded data.

However, the drop out amounts, P1, P2, P3, . . . P'1, P'2, P'3, . . . are irregular amounts, and moreover, they vary depending on the device, and slight control timing disparities occur among devices. For this reason, in the case where, in contrast to the present embodiment, FIGS. 6(C) and 6(D) have been recorded using two separate recording devices, the respective drop out amounts in FIGS. 6(C) and 6(D) never become the same, or the recording start points of the respective data blocks are shifted between FIGS. 6(C) and 6(D), and time (delay amount Td or more) shifts occur among the corresponding data blocks.

Figures 7A, 7B:
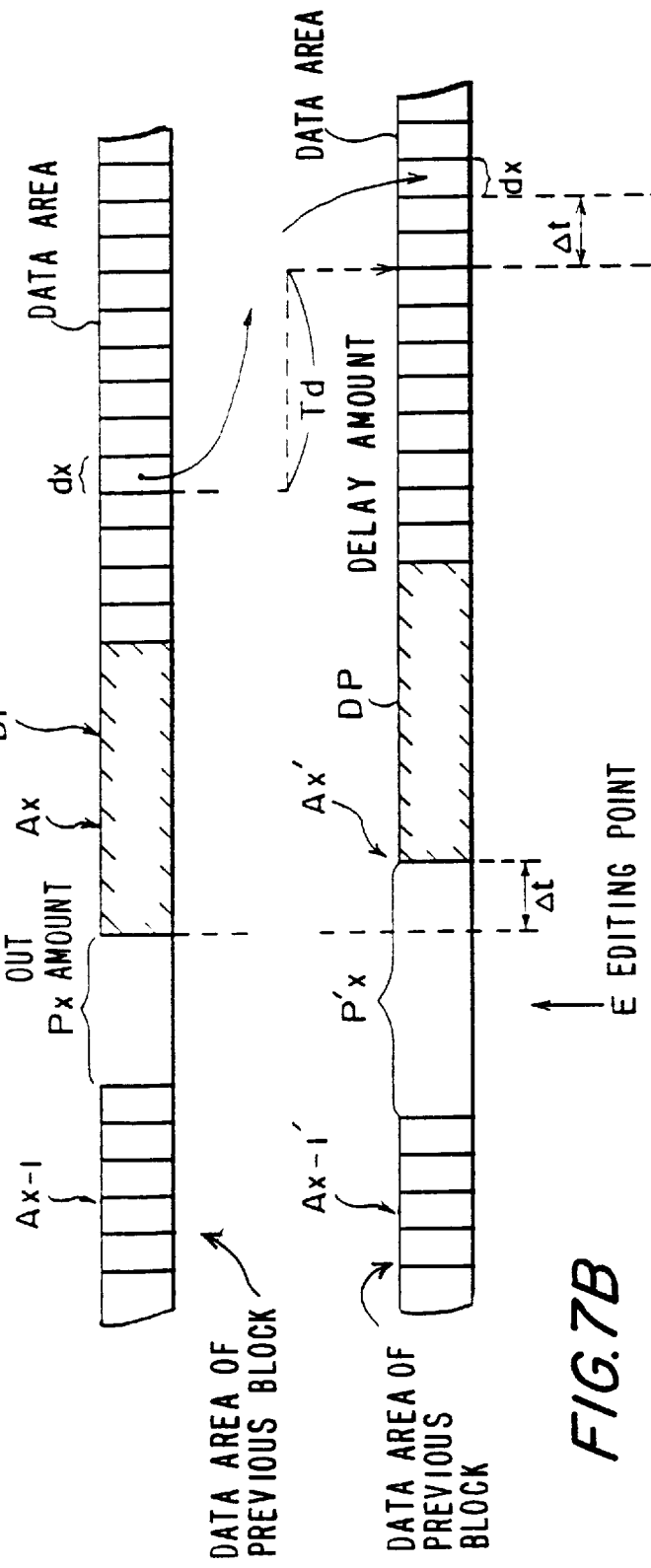
FIG. 7 is a diagram for explaining the conditions where a phase shift is generated.

FIG. 7 shows this status, where FIGS. 6(C) and 6(D) correspond to FIGS. 7(A) and 7(B) respectively and show the time shifts of the data blocks for a certain interval. Certain data dx, which is inside a certain data block Ax inside FIG. 7(A), seems to be at a position X1 which is delayed in time by delay amount Td, but actually, it is at a position X2 which is shifted by an amount Dt further than position X1 for the aforementioned reason. The amount of this Dt varies with each data block, and it is not such that, if one position is adjusted, all of those subsequent will match.

This is a problem which occurs not only between the aforementioned 3Ab and 3Ab' (3Bb and 3Bb', 3Cb and 3Cb') but which also occurs among recording devices 3A, 3B and 3C in the same way.

A well-known device is used as the video signal dividing device 10, for example, it is configured by a switching means, a three-system video data memory circuit and a control circuit which controls these, where digital video signal data which is recorded respectively by three units of divided master tape recording devices, 3A, 3B and 3C, is generated by periodically allocating digital video signals 2a to the three-system video data memory circuit prepared in the next step for each specified division unit by means of the aforementioned switching means; and a detailed explanation is omitted.

Dubbing Device

Next, the process of generating a 3X-speed recording signal with a high-speed dubbing device using three divided master tapes produced by the aforementioned divided master tape production devices, 3A, 3B and 3C, will be explained.

Figure 8:
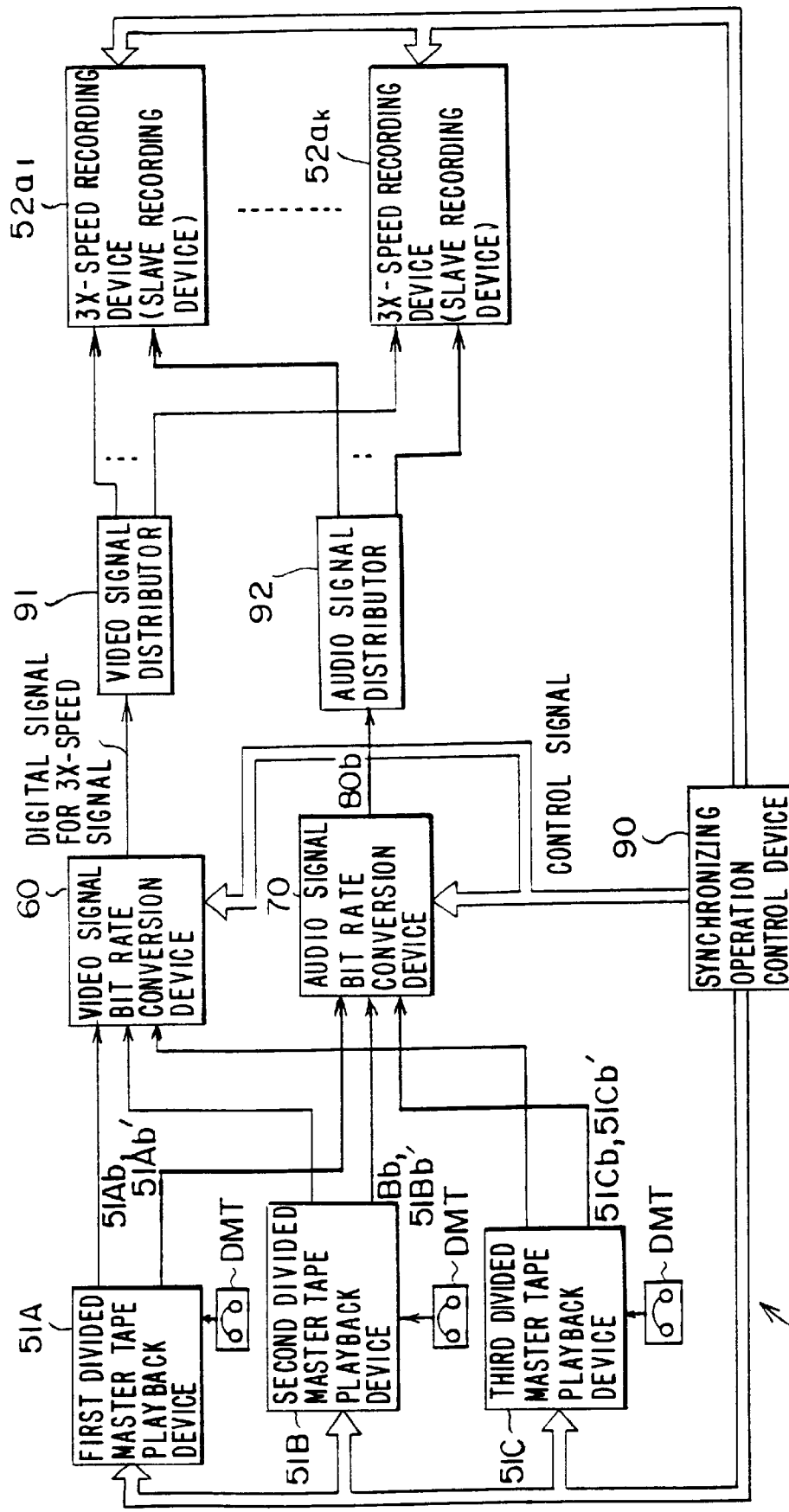
FIG. 8 is a block diagram which shows the dubbing device of the present invention.

FIG. 8 is a block diagram which shows the 3X-speed high-speed dubbing device 50 of the present invention.

51B and 51C are the first through third divided master tape playback devices, which play back the three divided master tapes DMT produced by the aforementioned divided master tape production device 1 at the same speed as when they were respectively recorded. These playback devices, 51A, 51B and 51C, use the same specifications as the divided master tape recording devices, 3A, 3B and 3C, in the aforementioned divided master tape production device, they have a function which is able to play back two systems of audio signals simultaneously, and have the same number of units as the number of divided master tapes.

Moreover, because the method of combining the aforementioned three divided master tapes DMT is important, the configuration may be such that, basically, an identification code is assigned to each divided master tape so that the recording devices and the playback devices, for example, 3A and 51A, 3B and 51B, and 3C and 51C, correspond; each playback device, 51A, 51B and 51C, recognize the aforementioned identification code, and each divided master tape is played back respectively in the correct combination.

The video signal bit rate conversion device 60 and the audio signal bit rate conversion device 70 generate a 3x-speed recording digital signal by means of the aforementioned divided master tape playback devices, 51A, 51B and 51C, respectively writing the video signals and the audio signals obtained by continuously playing back from the recording start points of the respective divided master tapes DMT in synchronization and simultaneously, performing array conversion so that a same array as the signals recorded in the respective original master tapes results, and by retrieving at three times the speed or writing. 52*al* through 52*ak* are 3X-speed recording devices, which are the slave recording devices, and they have been improved to operate at three times the normal tape feed speed and three times the normal rotation speed of a drum which has a recording head.

In order for the tapes recorded by these 3X-speed recording devices, 52*al* ~52*ak*, to finally become a product, a large number of units is normally prepared, and the signals output from the respective bit rate conversion devices, 60 and 70, are divided into signals corresponding to that number of units depending on the video signal distributor 91 and the audio signal distributor 92 respectively.

The signals from the respective bit rate conversion devices, 60 and 70, are in digital format, so that when the 3X-speed recording devices, 52*al* through 52*ak*, are in VHS system analog format for example, after digital/analog (D/A) conversion is performed, modulation may be implemented so that they become appropriate for the recording system. In such a case, it is possible to prevent deterioration in signal transmission by striving to perform signal transmission while still in digital format and performing the aforementioned conversion and modulation processing immediately before input to the 3X-speed recording devices, 52*al* ~52*ak*.

Then, a synchronization operation control device 90 controls the operation of these devices. This performs control so that the overall synchronization of the high-speed dubbing device 50 is maintained, and in addition to controlling the starting and stopping of the respective device operations, it performs control of the synchronized playback of the first through third divided master tape playback devices, 51A, 51B and 51C, and controls the generation of a reference signal for rate conversion in the bit rate conversion devices, 60 and 70.

Figure 9:
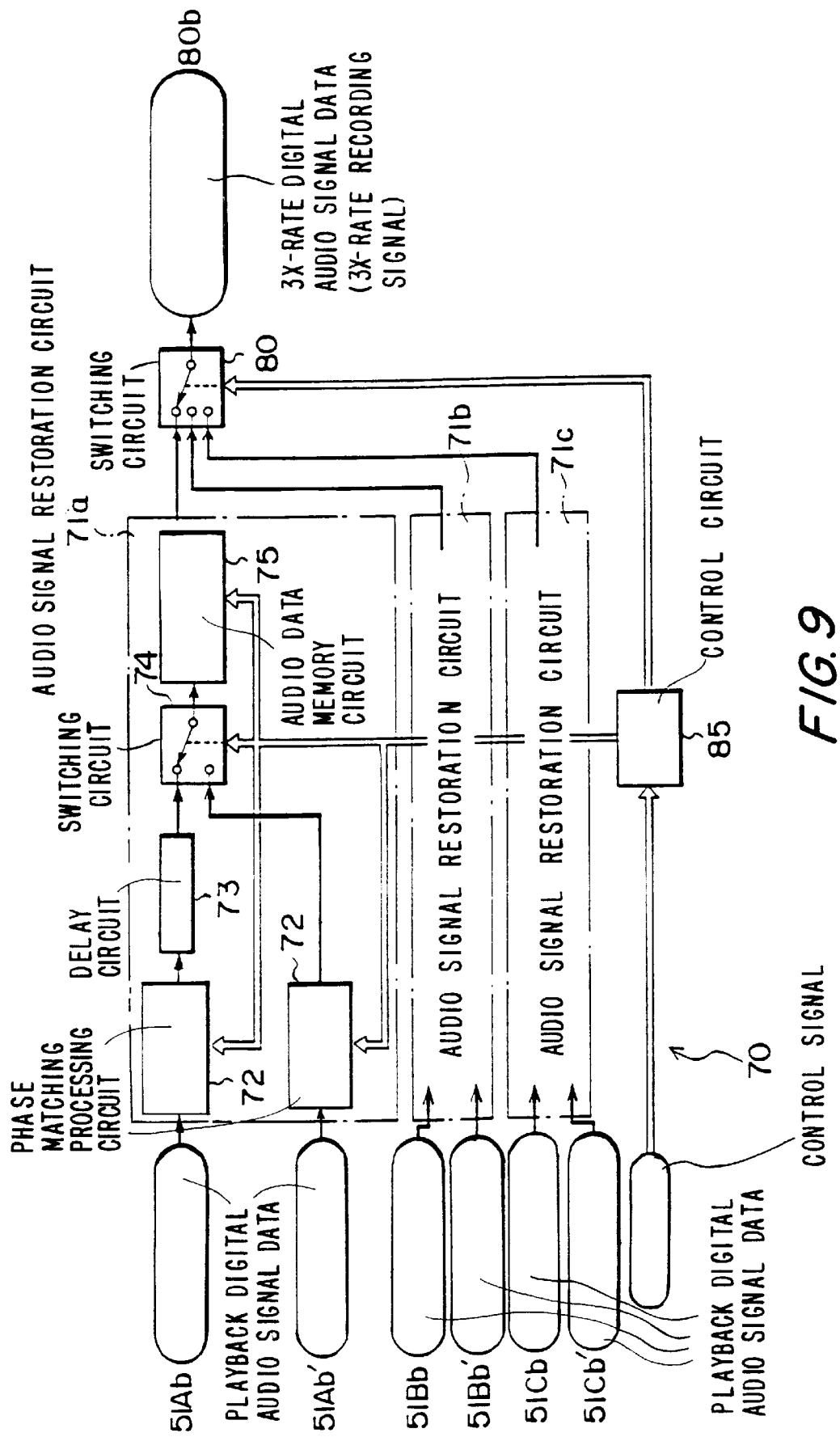
FIG. 9 is a block diagram which shows the internal configuration of the audio bit rate conversion device of FIG. 8.

FIG. 9 is a block diagram which shows the internal configuration of the audio signal bit rate conversion device 70 of FIG. 8.

The audio signal bit rate conversion device 70 consists mainly of three audio signal restoration circuits, 71*a*, 71*b* and 71*c*, as the phase matching means which characterize the present invention, a switching circuit 80, and a control circuit 85. The aforementioned three audio signal restoration circuits, 71*a*, 71*b* and 71*c*, each have the same configuration, and they each consist of a two phase matching processing circuits 72, a delay circuit 73, an switching circuit 74, and an audio data memory circuit 75.

Next, the operation of the audio signal restoration circuit 71*a* will be explained.

There are two systems of playback for audio signals from the first divided master tape playback device 51A, where one is the playback digital audio signal data 51Ab of the signal recorded without delay processing during production of the aforementioned divided master tape and the other is the playback digital audio signal data 51Ab' of the signal recorded with delay processing. These respectively enter the phase matching processing circuit 72, and the phase shift is corrected based on phase matching code data replaced and recorded during divided master tape production. Next, only the signals without delay processing undergo delay processing by the delay circuit 73. The amount of this delay is set so that it becomes equal with the delay amount Td of the delay circuit of the aforementioned divided master tape production device. That is, the time shift of both of the playback music signal data, 51Ab and 51Ab', is eliminated by means of the delay circuit 73.

After that, there is writing to the audio data memory circuit 75 while selectively switching the output of both processing circuits so that the data drop out sections and sections which have been replaced by phase matching code data are compensated by other signal data. This, restores to divided audio signal data which has no data drop outs or phase shifts, and has substantial accuracy, as the signal data written to the audio data memory circuit 32 of the processing circuit 24*a* of the aforementioned master tape production device 1 results.

This is also true for the other restoration processing circuit, where the playback digital audio signal data, 51Bb and 51Bb', from the second divided master tape playback device 51B and the playback digital audio data, 51Cb and 51Cb', from the third divided master tape playback device 51C each become normal divided audio signal data and are written to the respective audio data memory circuits by means of restoration processing circuit 71*b* and restoration processing circuit 71*c* respectively.

Next, by retrieving from the respective memory circuits at three times the speed of writing to the aforementioned memory circuit 75, 3X-rate divided audio signal data results from the three restoration circuits, 71*a*, 71*b* and 71*c*, and divided audio signal data is output.

Next, by rearranging the 3X-rate divided audio signal data, which is output from the aforementioned three systems by means of the switching circuit 80, so that the original order results, the contents become the same as those of the digital audio signal data during playback of the original master tape, and 3X-rate digital audio signal data 80*b*, whose transmission rate has been tripled, is generated as the NX-speed recording signal.

The control circuit 85 synchronizes the respective devices and performs signal processing by controlling the operations of the respective circuits, and it also performs generation of the writing address data and the 3X-rate retrieval address data for the audio data memory circuit.

Here, the aforementioned delay circuit 73 and the switching circuit 74 can be substituted for by the memory circuit, and substitution can be performed by controlling the read out address so that data compensation is performed during writing to or read out from the address which has been shifted by the delay amount with respect to the data which passes through the delay circuit 73. It is also possible to substitute for the switching circuit 80 by standardizing the bus line of the audio signal data and controlling this bus line.

Next, the internal configuration of the aforementioned phase matching processing circuit 72 will be explained based on FIG. 10.

Figure 10:
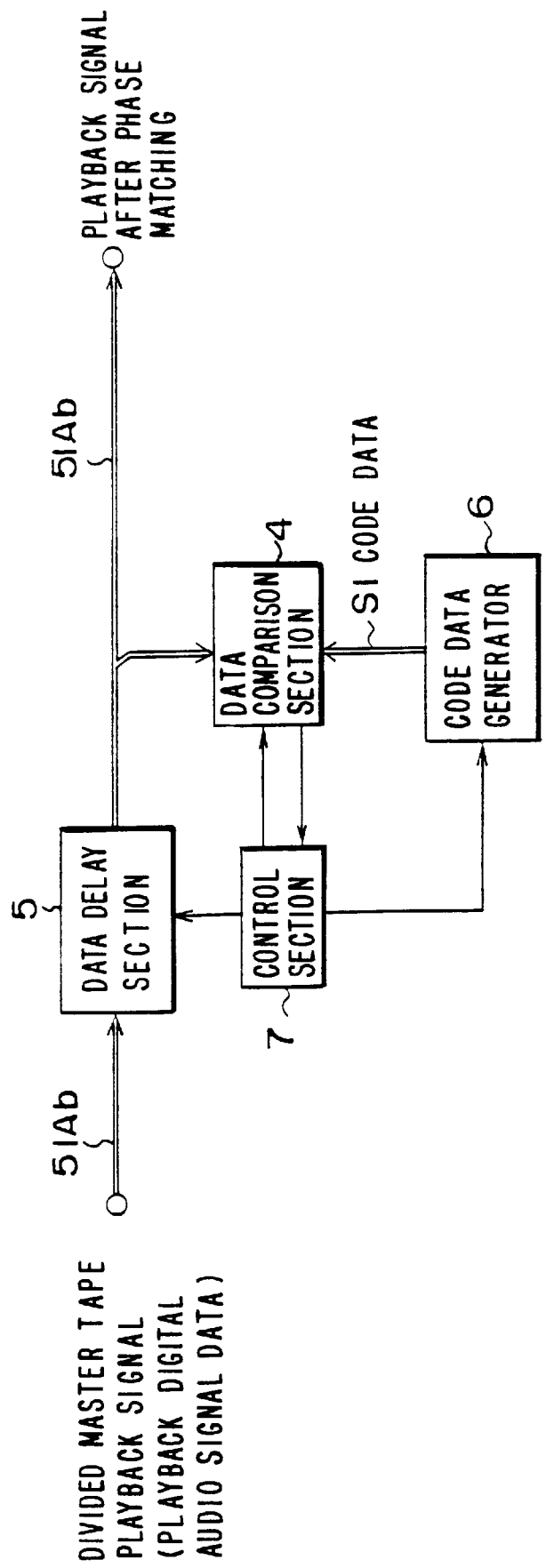
FIG. 10 is a block diagram which shows the internal configuration of the phase matching processing circuit.

In the data comparison section 4 in FIG. 10, the divided master tape playback signal (playback digital audio signal data), for example 51Ab, output from the data delay section 5 is compared with the code data S1 from the code data generator 6, and a determination is made as to whether the phases match. That is, the same pattern as the aforementioned phase matching code data DP (see FIG. 5), for example, a pattern which consists of an aggregate of the consecutive integers from 0 to 255, is output as this code data S1, and the code data S1 is compared with the data of the aforementioned playback signal 51Ab one bit at a time, and when the result is such that the data patterns match, the phases match.

When the phases do not match, the playback signal 51Ab is delayed until the aforementioned data patterns match by means of controlling the aforementioned data delay section 5 using the control section 7, the delay amount is fixed at the point where they match, and the data of that data block is output. Each time there is a shift to the next data block processing, the delay amount also returns to the initial condition as the code data pattern is output from the first bit, and the same processing is repeated.

The divided master tape playback signals, 51Bb and 51Bb' as well as 51Cb and 51Cb', of the other systems also match phases with the data of the corresponding code data generator using the same type of circuit. In this way, by matching to the phase of the data of the code data generator, the playback signal data of the respective systems of divided master tapes can be adjusted to the specified phase.

A playback signal which has been completely matched with the specified phase in this way is shown in FIG. 11. FIG. 11(A) is the non-delayed divided master tape playback signal which corresponds to the signal in FIG. 6(C), and FIG. 11(C) is the delayed divided master tape playback signal which corresponds to the signal in FIG. 6(D).

By implementing delay processing on the playback signals shown in the aforementioned FIG. 11(A) by the delay amount Td by means of delay circuit 73 (see FIG. 9), a playback signal such as that shown in FIG. 11(B), whose time phase completely matches the playback signal of FIG. 11(C), is generated.

If a playback signal such as that shown in FIG. 11(B) is generated, by then switching the signal selected by the switching circuit 74 at switching point Ex, the valid data portions DE shown by the diagonal lines in FIG. 11(B) and 11(C) are obtained, and it is possible to restore a signal, such as that shown in FIG. 11(D), in which the specified division units of signal data blocks, A1, A2, A3 . . . , are consecutively arranged with no data drop outs.

By performing the same type of processing on the other divided audio signal data (see FIG. 11(E)), the phase shift is adjusted not only between non-delayed and delayed but among the playback devices as well. Then, by correctly rearranging the signal data for which these phases have been matched, it is possible to generate data which is the same as the original master tape audio playback signal data.

A well-known device is used as the video signal dividing device 10, for example, one which is configured by a three-system memory circuit, a switching means, and a control circuit which controls these, where three-systems of playback digital video signal data output from the divided master tape playback devices, 51A, 51B and 51C, are respectively read into the aforementioned memory circuit, and then, by rearranging so that the original order results by means of the aforementioned switching means retrieval is performed at three times the speed of the aforementioned reading, 3X-rate video signal data is generated; and a detailed explanation is omitted.

Until this point, the explanation was based on N=3, but application is, of course, possible in the same way when N=2, 4, 5 or a higher value.

Also, an aggregate of consecutive integers which were counted up from 0 to 255 was used as the phase matching code data in the aforementioned embodiment, but the invention is not limited to this; the data may also be such that the generated data of the phase matching code data generation circuit (31 in FIG. 4) and the generated data of the code data generator (6 in FIG. 10) have the same data arrangement and such that the contents of individual code data block are all different. For example, a memory access value may also be used.

Figure 13A:
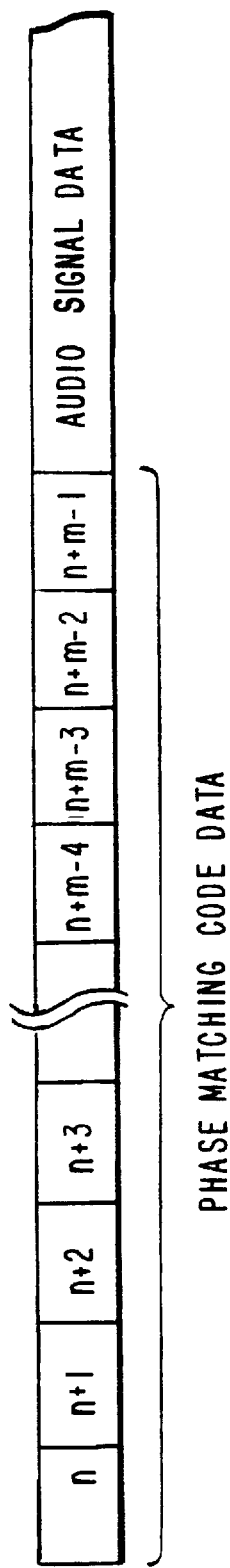
FIGS. 13(A) and (B) are diagrams which shows another example of the code data for phase matching.
Figure 13B:
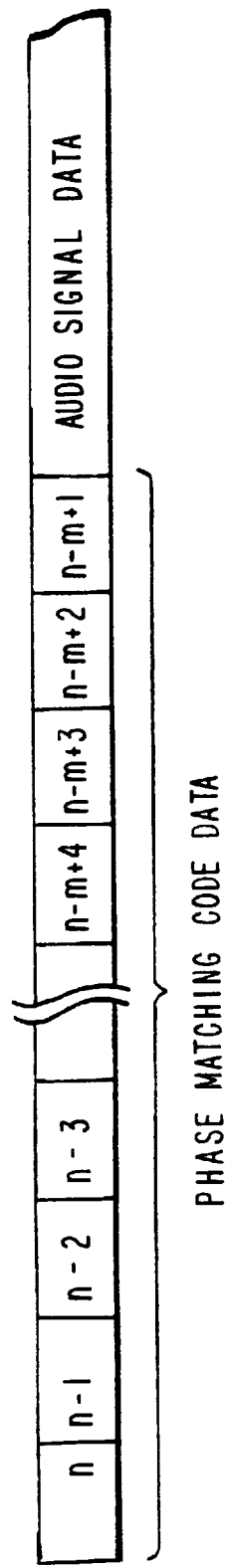

FIG. 13(A) is an example of the phase matching code data of data length m which uses address data which is counted up from n (n: the specified memory access value), and FIG. 13(B) is an example of phase matching code data of data length m which uses address data which is counted down from n.

Figure 12:
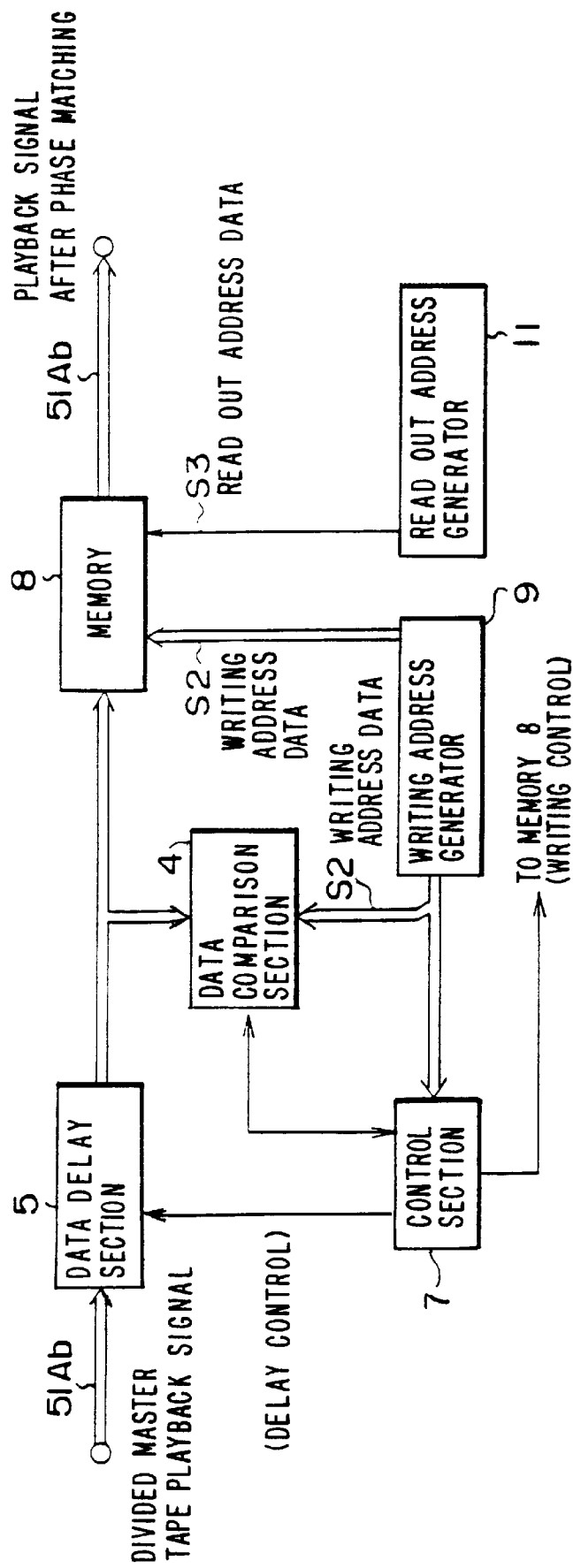
FIG. 12 is an outline block diagram of another example of a phase matching processing circuit which performs phase matching.

FIG. 12 shows another embodiment of the phase matching processing circuit.

Through this, the code data generator 6 shown in FIG. 10 can be replaced by the writing address generator 9, and the writing address data S2 generated from this point on is also used as code data for comparison. This address data can also be used by a separate phase matching processing circuit, so that the circuit can be simplified. In such a case, the phase matching code data can be made the same as the aggregate of consecutive memory address values, as shown in the aforementioned FIG. 13(A) or 13(B).

Also, the data length of the phase matching code data may be set so that, while making sure that the minimum required data for phase matching does not drop out after considering the amount of data drop out resulting from device side conditions, the memory capacity becomes larger when it is too long and so that there is no effect on processing speed. Code 11 is the retrieval address generator which outputs the retrieval output data S3.

Also, in the present embodiment, the phase matching code data was put into the front sections of the respective data blocks, but the present invention is not limited to this; it may also be put into multiple places.

Effects of the Invention

As explained above, the following effects are made possible by the divided master tape production device, dubbing device and dubbing system equipped with these devices of the present invention. (1) Through the divided master tape production device of the present invention, when multiple divided master tapes are produced by dividing master tape audio signal data, it is possible to add phase matching code data to the respective data blocks by means of data replacement. Therefore, it is possible to refer to this code data during divided master tape playback. (2) Through the dubbing device of the present invention, in the case where the multiple master tapes produced in the aforementioned way are played back and given an array with the same contents as the original master tape, it is possible to adjust and match the phase shift among multiple playback signals by referring to the phase matching code data.

Therefore, by extracting and arraying the effective data portion, it is possible to generate signals of a time series array which is continuous, has no drop outs, and which is the same as that of the master tape playback signals. In such a case, the slave recording device are able to perform recording at a speed which corresponds to several times normal speed tape division, and high-speed dubbing with no audio data drop outs can be implemented. (3) Through the dubbing system of the present invention, the divided master tape production device and the dubbing device were combined to construct a system, and it was possible to continuously perform the playback and recording flow, and particularly, phase matching code data was located in the respective blocks of the audio signal data during divided master tape production, and during dubbing, this code data was used to match the phases of the respective divided master tape playback signals, so it is possible to stably generate a signal with the same time series signal arrangement as that of the original master tape signal without interruption from N systems of divided master tape without making the structure complicated. Therefore, the quality of dubbing can be greatly increased, and its reliability can be increased.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A divided master tape production device which plays back a master tape and produces N (where N is an integer of 2 or more) divided master tapes comprising:

master tape playback means for playing back a master tape at a nominal playback speed to obtain a continuous digital audio signal;

dividing means for dividing the continuous digital audio signal obtained from the master tape playback means by a specified division unit to provide a plurality of data blocks in the digital audio signal and for converting the plurality of data blocks into the continuous digital signal to generate N systems of divided master tape playback signals;

N units of phase data replacement means, corresponding in number to the N systems of divided master tape playback signals generated by the dividing means for replacing a certain fixed length section of each data block with phase matching code data; and N units of divided master tape recording means, corresponding in number to the N systems of divided master tape playback signals, in which a part of the data blocks has been replaced by phase matching code data by said phase data replacement means, wherein said N units of divided master tape recording means includes means for sequentially assigning and feeding the divided master tape playback signals and in order, for intermittently recording the data blocks with the phase matching code data therein onto tape at the nominal playback speed and for producing N divided master tapes, wherein each of said N units of the phase data replacement means includes a pair of processing circuits that comprise:

a phase matching code data generating circuit that outputs phase matching code data, a memory circuit that sequentially outputs the input signal data while the input signal data is being recorded, a writing/read out control circuit that controls an operation of the memory circuit, a switching circuit for selectively switching an output of the phase matching code data generating circuit and the memory circuit, and a switching control circuit for controlling an operation of the switching circuit at a specified timing, and wherein a delay circuit, for delaying input signal data by the specified amount of time, is located at a stage prior to one of the pair of processing circuits.

2. The divided master tape production device of claim 1, wherein the code data comprises an aggregate of a series of numerical data which increases in units of +1 from 0 to a certain number.

3. The divided master tape production device of claim 1, wherein the code data comprises an aggregate of consecutive memory address values.

4. A dubbing system which performs dubbing by playing back a master tape, creating N (where N is an integer of 2 or more) divided master tapes, and integrating the recorded data of the N divided master tapes, comprising;

master tape playback means for playing back a master tape at a nominal playback speed to obtain continuous digital audio signal;

dividing means for dividing the continuous digital audio signal obtained from the master tape playback means by a specified division unit to provide a plurality of data blocks in digital audio signal and for converting the plurality of data blocks into the continuous digital signal to generate N systems of divided master tape playback signals;

N units of phase data replacement means, corresponding in number to the N systems of divided master tape playback signals generated by the dividing means, for replacing a certain fixed length section of each data block with phase matching code data;

N units of divided master tape recording means, corresponding in number to the N units of divided master tape playback signals, in which a part of the data blocks has been replaced by phase matching code data by the phase data replacement means, wherein said N units of divided master tape recording means includes means for sequentially assigning and feeding the divided master tape playback signals and in order, for intermittently recording the data blocks with the phase matching code data therein onto tape at the nominal playback speed and for producing N divided master tapes;

N units of divided master tape playback means for, simultaneously and in synchronism, playing back the N divided master tapes produced by the N units of divided master tape recording means to obtain N systems of playback signals;

phase matching means corresponding in number to the respective N systems of playback signals obtained from the N units of divided master tape playback means, for obtaining a valid data portion based on the phase matching code data and for matching the phases of the N systems of playback signals;

NX-speed recording signal generating means for compressing the N systems of playback signals to 1/N to generate an NX-speed recording signal, and for arraying the N systems of playback signals having phases which have been matched by the phase matching means so that the N systems of playback signals become the same as the original master tape playback signal; and slave recording means for recording the NX-speed recording signal generated from the NX-speed recording signal generating means onto a slave recording medium at N times the nominal playback speed, wherein each of said N units of the phase data replacement means includes a pair of processing circuits that comprise:

a phase matching code data generating circuit that outputs phase matching code data, a memory circuit that sequentially outputs the input signal data while the input signal data is being recorded, a writing/read out control circuit that controls an operation of the memory circuit, a switching circuit for selectively switching an output of the phase matching code data generating circuit and the memory circuit, and a switching control circuit for controlling an operation of the switching circuit at a specified timing, wherein a delay circuit, for delaying input signal data by the specified amount of time, is located at a stage prior to one of the pair of processing circuits, and wherein the phase matching means comprises;

a pair of phase matching processing circuits which correct phase shift based on the phase matching code data, a delay circuit which is located at a stage following one of the pair of phase matching processing circuits in order to delay by an amount which is the same as a recording data delay amount provided during production of the divided master tapes, and a switching circuit which switches between an output of this delay circuit and an output of another processing circuit.

5. A system as claimed in claim 4, wherein said phase matching means comprises, a data delay section for delaying and outputting the input playback signal, a code data generator which outputs code data in a same pattern as the phase matching code data;

a data comparison section which compares the phase matching code data and the output signals from the data delay section, and a control section which controls the data delay section so that said output signals of said data delay section are delayed until the data matches in this data comparison section.

6. The dubbing system of claim 4, wherein the phase data replacement means, comprises:

means for aggregating a series of numerical data which increases in units of +1 from 0 to a certain number as the data phase matching code data.

7. The dubbing system of claim 4, wherein the phase data replacement means, comprises:

means for aggregating consecutive memory address numbers as the data phase matching code data.

* * * * *